(12) United States Patent
Zhang et al.

(10) Patent No.: US 8,468,342 B2
(45) Date of Patent: Jun. 18, 2013

(54) COMPUTER SYSTEM AND METHOD FOR PERFORMING INTEGRITY DETECTION ON THE SAME

(75) Inventors: Yi Zhang, Beijing (CN); Jian Zhou, Beijing (CN); Zhenxin Xi, Beijing (CN); Hongping Tian, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1012 days.

(21) Appl. No.: 12/083,894

(22) PCT Filed: Mar. 15, 2006

(86) PCT No.: PCT/CN2006/000401
§ 371 (c)(1),
(2), (4) Date: Jul. 10, 2009

(87) PCT Pub. No.: WO2007/045133
PCT Pub. Date: Apr. 26, 2007

(65) Prior Publication Data
US 2009/0300415 A1  Dec. 3, 2009

(30) Foreign Application Priority Data
Oct. 19, 2005 (CN) .......................... 2005 1 0112892

(51) Int. Cl.
  G06F 7/20    (2006.01)
  G06F 11/30   (2006.01)

(52) U.S. Cl.
  USPC .................. 713/164; 713/1; 713/2; 713/187; 726/2; 726/16; 726/17

(58) Field of Classification Search
  USPC ........................ 713/1–2, 187; 726/2, 16–17
  See application file for complete search history.

(56) References Cited

U.S. PATENT DOCUMENTS

| 6,948,094 | B2  |   | 9/2005  | Schultz et al. |   |
|---|---|---|---|---|---|
| 7,136,994 | B2 | * | 11/2006 | Zimmer et al. | 713/2 |
| 7,207,039 | B2 | * | 4/2007  | Komarla et al. | 717/178 |
| 7,467,370 | B2 | * | 12/2008 | Proudler et al. | 717/100 |
| 7,752,428 | B2 | * | 7/2010  | Datta et al. | 713/2 |
| 8,001,348 | B2 | * | 8/2011  | Doran et al. | 711/163 |
| 2004/0123086 | A1 |   | 6/2004 | Dorwin et al. | |
| 2004/0158698 | A1 | * | 8/2004 | Rothman et al. | 713/1 |
| 2005/0149924 | A1 | * | 7/2005 | Komarla et al. | 717/176 |
| 2006/0155988 | A1 | * | 7/2006 | Hunter et al. | 713/164 |
| 2006/0230165 | A1 | * | 10/2006 | Zimmer et al. | 709/230 |

FOREIGN PATENT DOCUMENTS

CN   1632756 A   7/2005

* cited by examiner

*Primary Examiner* — Yin-Chen Shaw
(74) *Attorney, Agent, or Firm* — Kinney & Lange, P.A.

(57) ABSTRACT

The present invention proposes a computer system and a method capable of performing integrity detection, comprising: a running mode unit which comprises an integrity detection boot variable to determine whether or not to initiate an integrity detection boot mode by judging said running mode unit; an EFI integrity detection unit (5), which is used for performing an integrity detection on EFI image codes in the integrity detection boot mode, and comprises an integrity metric value for being compared with an EFI integrity calculated value generated after the EFI integrity detection unit performs the integrity detection on the EFI image codes, to determine the integrity of the EFI image codes; an operating system integrity detection unit (6); and an integrity management unit. The present invention is based on the EFI BIOS to perform the integrity detection on the operating system during the pre-boot stage, having better reliability and security.

25 Claims, 6 Drawing Sheets

COMPUTER SYSTEM AND METHOD FOR PERFORMING INTEGRITY DETECTION ON THE SAME

BACKGROUND OF THE INVENTION

1. Field of Invention

The present invention relates to computer systems, more particularly, to a computer system and a method for performing integrity detection on the system before booting the operating system.

2. Description of Prior Art

Currently, computer network technologies play a role in various aspects of individuals and corporations. The requirement for security of computers is increasing. And people expect to ensure that the system operates in a reliable operating system environment from booting. That a system is initialized from a secure and clean system is the basis of antivirus operations and protection from virus' inbreak. If the current running operating system is an unreliable running environment which has been infected, the subsequent security measures will be invalid. Therefore, a computer system and a method for realizing integrity detection immediately before initializing the system is needed to ensure the initialized operating system environment to be a secure trustable operation environment.

Generally, the integrity detection on the operating system is performed in the external system before the operating system starts to run. Therefore, a solution to the problems mentioned above is descried as follows:

The integrity detection on the operating system by the switching method through the dual-mode operating system is utilized. The computer system is installed with two operating systems, that is, it is installed with an additional small operating system in addition to the main operating system. In the computer bottom firmware running (Pre-boot) stage, it chooses to enter the additional small operating system, in which the integrity detection on the main operating system is performed. After the detection is finished, a flag bit is set and the system is reboot. The computer system automatically enters into the main operating system according to the setting of the flag bit and runs.

The disadvantages of the method include:

Disadvantage 1: Users need to switch the computer working mode frequently, which is not convenient; the additional small operating system (even it is reduced) still occupies much storage spaces of the system, increasing the cost of the computer's storage spaces.

Disadvantage 2: The method doesn't satisfy the strictness of the security and credibility chain. After the integrity detection on the main operating system is performed in the additional small operating system, the system must be reboot, resulting in that the security and credibility chain is broken and the security attack for the "additional operating system" also exists, and there is no scheme to ensure the reliability of the additional operating system.

Disadvantage 3: A flag bit must be set in the control process of the scheme to distinguish whether the procedure needs to enter the "additional operating system" or the procedure needs to enter the main operating system after the detection is finished. This increases the cost and the complexity of the scheme. There is still a secure hold caused by setting a flag bit. An ineligible users can skip the integrity detection on the system by simulating the flag bit. Meanwhile, the system needs to be rebooted after the detection is finished. There is room for improving the experiences of the users in this regard.

It can be seen that only when the operating system integrity detection and reliability detection are finished in the computer bottom firmware running stage (that is Pre-boot stage), it can ensure the coherence and continuity of the security and credibility chain to satisfy the security requirements. The operating system can be directly booted after the detection is finished, avoiding the design of the operating system booting flag bit and obtaining good experience of the users. But it is complex to achieve the above mentioned functions on the conventional computer bottom firmware (i.e. on the BIOS level), because the functions of the conventional BIOS is finite. Particularly the access interfaces for the file system are insufficient. It is difficult to achieve the analyses on the files of the complex operating system. Therefore, it is difficult to achieve the above mentioned functions on the conventional BIOS. This affects the further development of the technologies.

SUMMARY OF THE INVENTION

The object of the present invention is to provide a computer system and a method for performing an integrity detection, which detects the integrity of the operating system in the computer bottom firmware running stage based on EFI BIOS.

The computer system capable of performing the integrity detection provided for achieving the above mentioned object, comprises an EFI storage unit, and further comprises a running mode unit including an integrity detection initiating control parameter, wherein in the PEI stage, after the basic initialization of the CPU, chipsets, and main board is finished, it is determined that whether or not to initialize the integrity detection initiating mode by judging the running mode unit.

Said EFI storage unit comprises an EFI integrity detection unit, for performing the integrity detection on the EFI image codes in the integrity detection initiating mode;

said EFI integrity detection unit comprises an integrity metric value, for comparing, after the EFI integrity detection unit performs the integrity detection on the EFI image codes to generate an EFI integrity calculated value, the metric value and the calculated value to determine the integrity of the EFI image codes.

The running mode unit may be stored in the hardware unit.

An FV_RECOVERY unit in said EFI storage unit may be a read-only code unit.

Said computer system further comprises an EFI image code recovery unit, for invoking the EFI image recovery code in said EFI image code recovery unit to recover the EFI image code when the EFI integrity detection unit performs the integrity detection on the EFI image code and determines that the EFI image code is not integral.

Said computer system further comprises an operating system integrity detection unit, for forcibly performing the operating system integrity detection before initiating the operating system;

said operating system integrity detection unit comprises a credible file detection unit, for invoking the operating system integrity detection method to perform the integrity detection on every credible files, comparing and determining whether every credible files are tampered, generating the credible files calculated value for every files in turn, and performing the integrity detection on the files of the operating system;

said computer system further comprises a credible file metric value which is compared with the calculated value to determine the integrity of an individual file to thereby determine the integrity of all the files of the operating system, after the operating system integrity detection unit performs the integrity detection on every credible files, compares and determines whether every credible files are tampered, and generates the credible files calculated value for every files in turn.

Said operation integrity detection unit further comprises a magnetic disk parameter data detection unit, for reading out the magnetic disk parameter data, detecting whether the magnetic disk parameter data is integral, and then invoking the credible file detection unit to perform the integrity detection on the individual credible file;

said computer system further comprises a magnetic disk parameter metric value which is compared with the calculated value to determine the integrity of the operating system after the operating system integrity detection unit performs the magnetic disk parameter integrity detection on the magnetic disk on which the files of the operating system are stored and generates the magnetic disk parameter integrity calculated value.

Said computer system further comprises a magnetic disk parameter data recovery unit, for invoking the magnetic disk parameter data in said magnetic disk parameter data recovery unit to forcibly recover the magnetic disk data when the magnetic disk parameter data detection unit detects that the magnetic disk parameter is not integral.

Said computer system further comprises a credible file list, for looking up and comparing, after the magnetic parameter data detection is finished, the system credible file names, detecting whether all the credible files are present to ensure the integrity of the operating system credible files, and then invoking the credible file detection unit to perform the integrity detection on the individual credible file.

Said computer system further comprises an operating system credible file recovery unit, for invoking the pre-saved operating system credible recovery files to recover the credible files forcibly, when said operating system credible file recovery unit determines that the operating system credible files are not integral or are tampered after the operating system integrity detection unit compares the operating system credible files through the credible file list or the credible file metric value and performing the integrity detection, thereby recovering the entire operating system environment.

The credible file metric value, the magnetic disk parameter metric value, the credible file list, the EFI image code recovery unit, the magnetic disk parameter data recovery unit and the operating system credible file recovery unit are stored in an EFI security storage component. Said EFI security storage component is a local security storage component or an external security storage component. When said external security storage component is a remote security component, said operating system credible file recovery unit is stored in the remote security storage component.

Said computer system further comprises a simple network driver and a simple TCP Socket driver, for being invoked to connect to the remote security storage component through the network, downloading the operating system credible recovery files stored in the remote security storage component into local, and recovering the operating system files, when the operating system files are determined to be not integral.

The computer system further comprises an integrity management unit, for setting whether the integrity detection boot mode is needed to be performed when booting the EFI, and allowing the users to customize the operating system credible files related to the operating system according to the requirement of the system running, and to regenerate the magnetic disk parameter metric value, the credible file list and the credible file metric value.

Said integrity management unit comprises:
a security level setting unit, for setting the boot mode of said computer system;
an Integrity presetting unit, for customizing the operating system credible files and regenerating the magnetic disk parameter metric value, the credible file list, the credible file metric value and the operating system credible files, and performing the integrity detection on the operating system according to the new comparison reference when the system performs the integrity detection again; and
an EFI integrity presetting unit, for running the EFI integrity presetting unit to generate a new EFI integrity metric value when the user selects the EFI integrity presetting management.

The present invention further provides a method for performing computer system integrity detection, comprising an EFI integrity detection. The method comprises steps of:

STEP A: the system is powered on to run the PEI stage; after the basic initializations of CPU, chipset and the main board are finished, it is determined whether to initiate the integrity detection boot mode or not; if yes, STEP B is performed; otherwise the computer system is booted in the conventional boot mode;

STEP B: the EFI integrity detection unit is invoked to calculate the EFI integrity calculated value when the EFI BIOS is booted in the integrity detection boot mode;

STEP C: the current EFI integrity metric value and the calculated value are compared with each other and it is judged whether they are equal or not; if they are equal, which means that the EFI image code is integral and the subsequent process of the EFI BIOS boot is performed, and if they are not equal, which means that the EFI image code is not integral, the following process is performed;

STEP D: when the EFI image code is not integral, the user selects whether to invoke the EFI image file recovery code in the EFI image file recovery unit or not; if yes, the EFI image code recovery is performed to finish the EFI integrity detection and the EFI subsequent process is performed; otherwise, it is terminated.

Said computer system integrity detection method further comprises an operating system integrity detection. The method further comprises steps of:

STEP E: after the EFI integrity detection is finished, the flow of the DXE stage is performed and the DXE dispatches an operating system integrity detection unit to be loaded into the internal memory;

STEP F: it enters the BDS stage, and if the running mode is the integrity detection setting, said operating system integrity detection unit in STEP E is invoked;

STEP G: a credible file detection unit in the operating system integrity detection unit invokes the operating system integrity detection method to perform an integrity detection on each credible file, to compare and judge whether each credible file is tampered, to generate a credible file calculated value for each file in turn, and to detect the integrity of the operating system files;

STEP H: the integrity of each individual credible file is determined according to the comparison between the credible file metric value and the calculated value, and thereby determining the integrity of all the credible files of the operating system.

Said operating system integrity detection further comprises steps of:

STEP I: when the operating system credible files are tampered, the user is informed that an operating system credible file recovery may be performed; if the user selects "Not Recover", it stops loading the operating system, and if the user selects "Recover", it goes to the next step;

STEP J: it detects whether the files of the local operating system coincide with the corresponding operating system credible files or not; if yes, it loads and runs the operating system; otherwise, it goes to the next step;

STEP K: the user is informed whether to perform the recovery; if the user selects "Not Recover", it stops loading the operating system; and if the user selects "Recover", the corresponding operating system credible files are copied to cover the corresponding files, the operating system is loaded and run.

Said STEP G may further comprise a step of:

STEP G1: the operating system integrity detection unit first invokes a magnetic disk parameter data detection unit to read out the magnetic disk parameter MBR, the active partition, and partition table information, to calculate calculated value of the MBR, the active partition, and the partition table information by a hash algorithm, to compare the calculated value with the magnetic disk metric value to detect whether the magnetic disk parameter is integral or not, then it invokes a credible file detection unit in the operating system integrity detection unit to perform the integrity detection on the individual credible file.

Said STEP G1 may comprise a step of:

STEP G11: when the magnetic disk parameter data detection unit detects that the magnetic disk parameter is not integral, the magnetic disk parameter data in a magnetic disk parameter data recovery unit is invoked to forcibly recover the magnetic disk data.

Said STEP G may further comprise a step of:

STEP G2: after the detection on the magnetic disk parameter data is finished, it performs an operating system credible file list detection, looks up and compares the names of the operating system credible files, detects whether all the credible files are present or not to ensure the integrity of the operating system credible files, then it invokes the credible file detection unit to perform the integrity detection on the individual files.

Said STEP G2 may further comprise a step of:

STEP G21: when the operating system credible file list has been detected that the operating system credible file is not present, it invokes an operation credible file recovery unit to forcibly recover said operating system credible file.

Additionally, said operating system integrity detection may further comprise steps of:

STEP I: when the operating system files are not integral, it informs the user that the operating system credible file recovery can be performed; if the user selects "Not Recover", it stops loading the operating system; and if the user selects "Recover", it invokes a simple network driver and a simple TCP Socket driver to connect to a remote network;

STEP J: it detects whether the files of the operating system coincide with the corresponding operating system credible files or not; if yes, it disconnects a bottom level network connection, loads and runs the operating system; otherwise, it goes to the next step;

STEP K: it informs the user whether to recover or not; if the user selects "Not Recover", it stops loading the operating system; and if the user selects "Recover", the corresponding operating system credible files in the remote server are copied and sent to local to cover the corresponding files, then it disconnects a bottom level network connection, loads and runs the operating system.

Said STEP G may further comprise a step of:

STEP G1: the operating system integrity detection unit first invokes a magnetic disk parameter data detection unit to read out the magnetic disk parameter MBR, the active partition, and partition table information, to calculate a calculated value of the MBR, the active partition, and the partition table information by a hash algorithm, to compare the calculated value with the magnetic disk metric value to detect whether the magnetic disk parameter is integral or not, then it invokes a credible file detection unit in the operating system integrity detection unit to perform the integrity detection on the individual credible file.

Said STEP G1 may comprise a step of:

STEP G11: when the magnetic disk parameter data detection unit detects that the magnetic disk parameter is not integral, the magnetic disk parameter data in a magnetic disk parameter data recovery unit is invoked to forcibly recover the magnetic disk data.

Said STEP G may further comprise a step of:

STEP G2: after the detection on the magnetic disk parameter data is finished, it performs an operating system credible file list detection, looks up and compares the names of the operating system credible files, detects whether all the credible files are present to ensure the integrity of the operating system credible files, then it invokes the credible file detection unit to perform the integrity detection on the individual file.

Said STEP G2 may further comprise steps of:

STEP G21: when the operating system credible file list has been detected that the operating system credible file is not present, it informs the user that the operating system credible files can be recovered; if the user selects "Not Recover", it stops loading the operating system; and if the user selects "Recover", it invokes a simple network driver and a simple TCP Socket driver to connect to a remote network;

STEP G22: it detects whether the files of the local operating system coincide with the corresponding operating system credible files or not; if yes, it disconnects a bottom level network connection and returns to perform the operating system credible file list detection; otherwise, it goes to the next step;

STEP G23: it informs the user whether to recover; if the user selects "Not Recover", it stops loading the operating system; and if the user selects "Recover", the corresponding operating system files in the remote server are copied and sent to local to cover the corresponding files, then it disconnects a bottom level network connection and returns to perform the operating system credible file list detection.

Said computer system integrity detection method further comprises an integrity management configuration, which comprises steps of:

STEP L: after the user passes through the operating system integrity detection, it is selected whether to enter an operating system integrity management unit;

STEP M: if the user does not select to enter the operating system integrity management unit, it directly initiates the operating system; and when the user selects to enter the operating system integrity management unit, it displays an operating system management interface, and the user performs management configurations on the operating system integrity; said STEP M comprises steps of:

STEP M1: when the user selects to perform a security level management, it runs a security level setting unit to set a current computer system security level;

STEP M2: when the user selects an operating system integrity file presetting management, an operating system integrity file presetting unit is run, and the user customizes the operating system credible files.

STEP M3: when the user selects an EFI code integrity presetting management, an EFI integrity presetting unit is run to generate a new EFI integrity metric value.

Said STEP M2 comprises steps of:

STEP M21: the operating system integrity presetting unit is run and the user is informed to select to either add or reduce the operating system credible files;

STEP M22: it regenerates a magnetic disk parameter metric value, a credible file list, a credible file metric value and the related operating system credible files, according to the operating system credible files selected by the user;

STEP M23: it stores the regenerated magnetic disk parameter metric value, credible file list, credible file metric value and the related operating system credible files into a security storage memory;

STEP M24: it returns to the operating system integrity management unit.

The effects of the present invention are in that, the present invention achieves a method and a system for performing the operating system integrity detection during the computer's bottom firmware running (Pre-boot) stage of the EFI BIOS; it effectively solves the authentication of the operating system integrity in the EFI BIOS level before booting the operating system; it effectively ensures the consistency and strictness of the security and credibility chain to satisfy the security requirements in using the computer; it effectively breaks through the limitation on performing the operating system integrity detection on the conventional BIOS to resolve the defects present on various methods mentioned above. The system and the method of the present invention may support many functions, and they have the advantages of simpleness and utility, more flexibility, supporting more functions and more applicability.

DETAILED DESCRIPTION OF PREFERRED EMBODIMENTS

Now, the preferred embodiments of the present invention will be described by referring to FIGS. 1-6. The embodiment describes a computer system for achieving the technical proposal of the present invention in an EFI environment and the steps for achieving the computer system integrity detection.

First, the EFI technology will be described for detailed description of the present invention.

The present invention relates to an Extensible Firmware Interface (EFI) technology. The Extensible Firmware Interface (EFI) appears in 1999 and is used as a new generation interface procedure to replace the Basic Input and Output System (BIOS) used for long time. The detailed description about the extensible firmware interface will be referenced to introduction about the EFI technology in the UFEI forum: http://www.UEFI.org. EFI is between the hardware apparatus and the operating system (such as Windows or Linux). Different from the conventional BIOS, EFI uses a C language, which is one of the high level programming languages widely used in the world and provides an extended function having not only the functions of the conventional BIOS but also better functions than the conventional BIOS. EFI has a design mechanism and configuration different from the conventional BIOS and it is the next generation BIOS criterion, which means much more engineers can be involved into the development of EFI to add much more valuable functions.

The basic functions of the EFI are:
hardware platform initialization;
supporting the operating system booting; and
platform management tools which deviate from the operating system.

The work modes of EFI can be summarized as: the booting of the system; the initialization of the standard firmware platform; loading EFI driver library and performing related procedure; selecting the system to be entered in the start menu of the EFI system and submitting the booting lead code; in a normal case, entering the system, and in an abnormal case, terminating the booting service and returning to the start menu of the EFI system. The engineers may add new functions to the EFI according to different requirements, such as more detailed and usable diagnostic function, self-configuration program, listing the faults possibly occurring in the system, and so on.

As shown in FIGS. 1-6, the computer system for achieving integrity detection is accomplished on the EFI BIOS, and comprises hardware and software, wherein the hardware includes a main board, a central processing unit (CPU), an internal memory, a hard disk and peripheral equipments.

The main board and CPU are those supporting EFT criterion, respectively.

As shown in FIGS. 1-6, the EFI storage unit 1 (EFI Flash ROM Layout) in the computer system of the present invention includes an FV-RECOVERY unit 2, an FV_NVRAM unit 3 and an FV_MAIN unit 4.

Figure 1:
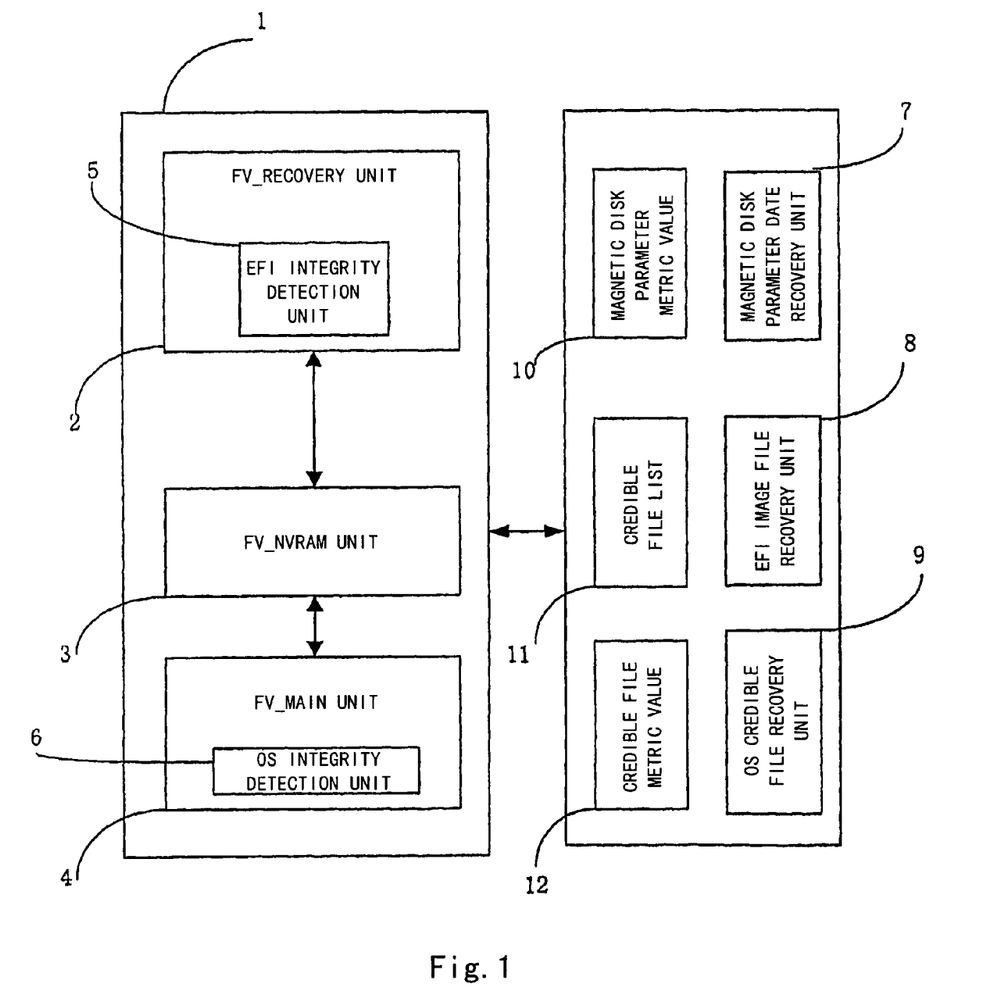
FIG. 1 is a schematic storage layout view of the present invention.

BIOS ROM storage unit 1 is a memory in the main board for storing BIOS, which may employ various types of chips, such as ROM, EPROM, EEPROM, FLASH ROM and the like.

The FV-RECOVERY unit 2, FV_NVRAM unit 3, FV_MAIN unit 4 are code segments or code volumes having different functions and partitioned according to respective storage addresses in the EFI storage unit 1.

1) The FV_RECOVERY UNIT 2 stores a running code unit during the SEC and PEI stages of the EFI.

SEC (Security) stage: which is initiated when the computer system is powered on, before the starting of the PEI foundation state, to check whether the first several lines of codes executed by the processor can be executed, and meanwhile to initialize a very small temporary internal memory for the running code unit during the PEI stage;

PEI (Pre-EFI initialization) stage is used to invoke the processor, the chipset, and the main board initialization configuration routines, to perform an initial initialization of the system, and to establish a minimum runable environment for being run during the DXE stage. Wherein, the function of the minimum runable environment includes: determining the boot path of the system; initializing the internal memory; initializing storage files of the basis input and output including a part of codes of the DXE to ensure that the files after the DXE file unit will be accessed correctly.

2) The FV_NVRAM unit stores system variables.

Some environment system variables necessary for EFI will be read out form this unit in a variable form.

3) The FV_MAIN unit includes a running code unit for the DXE and the BDS stages.

DXE (Driver Execution environment) stage: which is used to accomplish the primary works of the initialization of the system platform, takes charge of the entire initializations of the CPU, chipsets and the system platform, provides sufficient services for the initiation of the operating system to ensure that the system can be run during the subsequent stages. In the file unit, the system will load a great number of EFI drivers to support the functions mentioned above.

BDS (Boot Device Selection) stage: which is used to select the boot devices of the operating system to prepare for booting the operating system.

Figure 6:
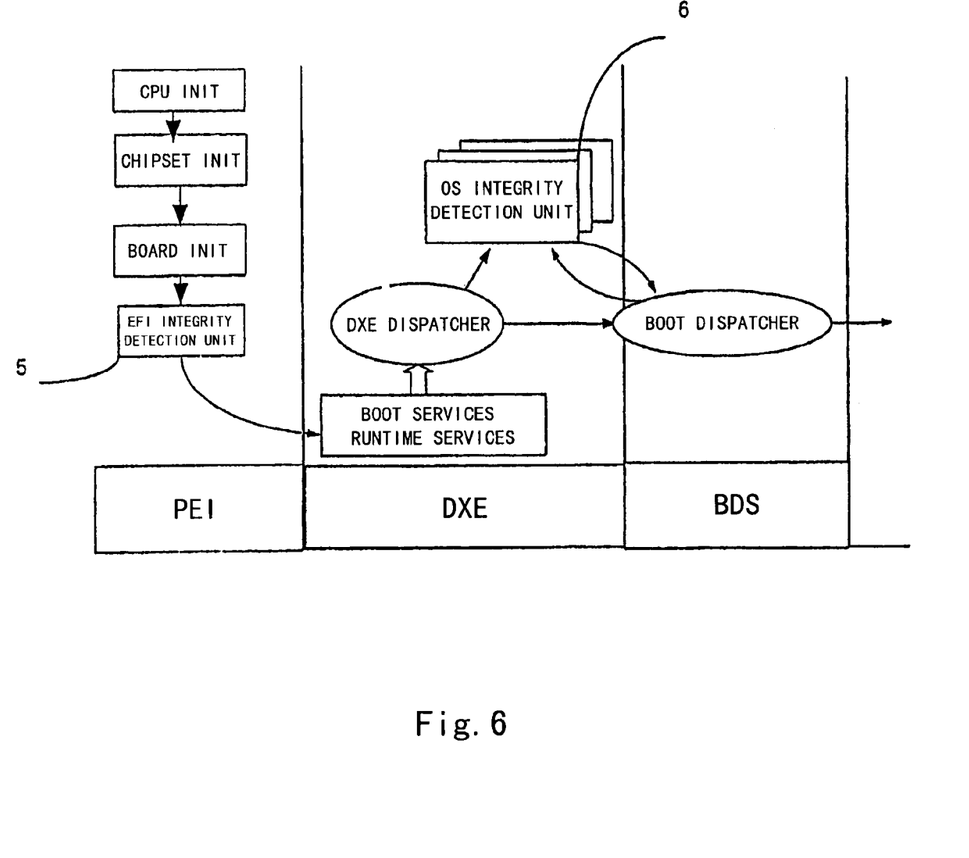
FIG. 6 is a schematic view of the integrity detection booting process according to the embodiment of the present invention.

As shown in FIG. 6, the present invention provides a framework-based EFI computer system. The whole running flow of EFI starts from a cold boot and undergoes several primary stages: SEC stage; PEI stage; DXE stage; BDS stage. Thereafter, there are some additional stages of EFI, which comprises an interaction and cooperation process between the EFI and the operating system in the course of booting the running the operating system: the TSL stage (Transient system load) stage allowing that the EFI service is invoked in the operating system loader process, in the case where the system has not been totally token in charge by the operating system; RT (runtime) stage which provides a parallel runtime service with the operating system to support the requirement of the operating system; AL (Afterlife) stage which means that the operating system reenters into EFI to continue taking in chare of the running when the operating system ends its execution.

The computer system of the present invention has a new Boot Mode, i.e. BOOT_IN_OS_INTEGRITY, in addition to the conventional Boot Mode. The computer system comprises:
a running mode unit, which comprises an integrity detection initializing control variable for controlling whether or not to boot the integrity detection boot mode (BOOT_IN_OS_INTEGRITY).

The running mode unit may be stored in the hardware unit. For example, a hardware switch is provided, one terminal of which is connected to the ground and the other terminal of which is connected to an I/O control module in the main board, and the interface between the hardware switch and the I/O control module may be GIPO, serial port, parallel port, or USB port, but it is not limited thereto. It determines whether the computer boot mode is an integrity boot mode according to the "open" or "close" states of the switch read from the I/O address where it is located.

The running code unit in the PEI stage comprises:
an EFI integrity detection unit 5 for being run to detect the integrity of the EFI image code after the initial initializations of the CPU (CPU INIT), the chipset (Chipset INIT), and the main board (Board INIT) are finished.

The EFI integrity detection unit 5 comprises an EFI integrity metric value, for determining the integrity of the EFI image code according the comparison between the metric value and an EFI integrity calculated value generated after the EFI integrity detection unit 5 performs the integrity detection on the EFI image code.

The EFI integrity detection unit 5 is stored in the FV_RECOVERY unit.

Preferably, the FV_RECOVERY unit 2 in said EFI storage unit 1 of the computer system is a read-only (ROM) unit.

Figure 2:
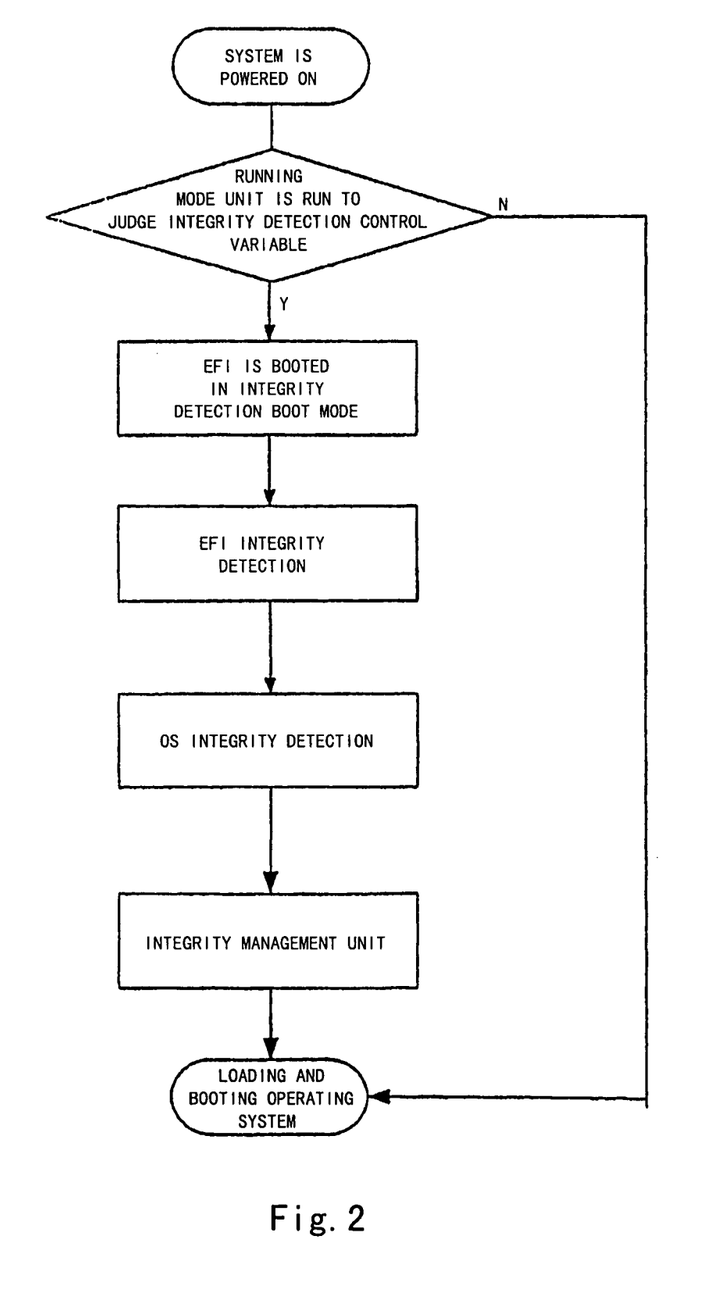
FIG. 2 is an EFI operation flowchart of the present invention.

After the system is powered on, performs SEC stage and enters the PEI stage, and the primary initializations of CPU (CPU INIT), chipset (chipset INIT), main board (Board INIT) are finished, it determines whether the boot mode is an integrity detection boot mode according to the running mode unit or not. If yes, the integrity detection boot mode is booted; otherwise, the computer system is booted according to a normal boot mode.

Figure 3:
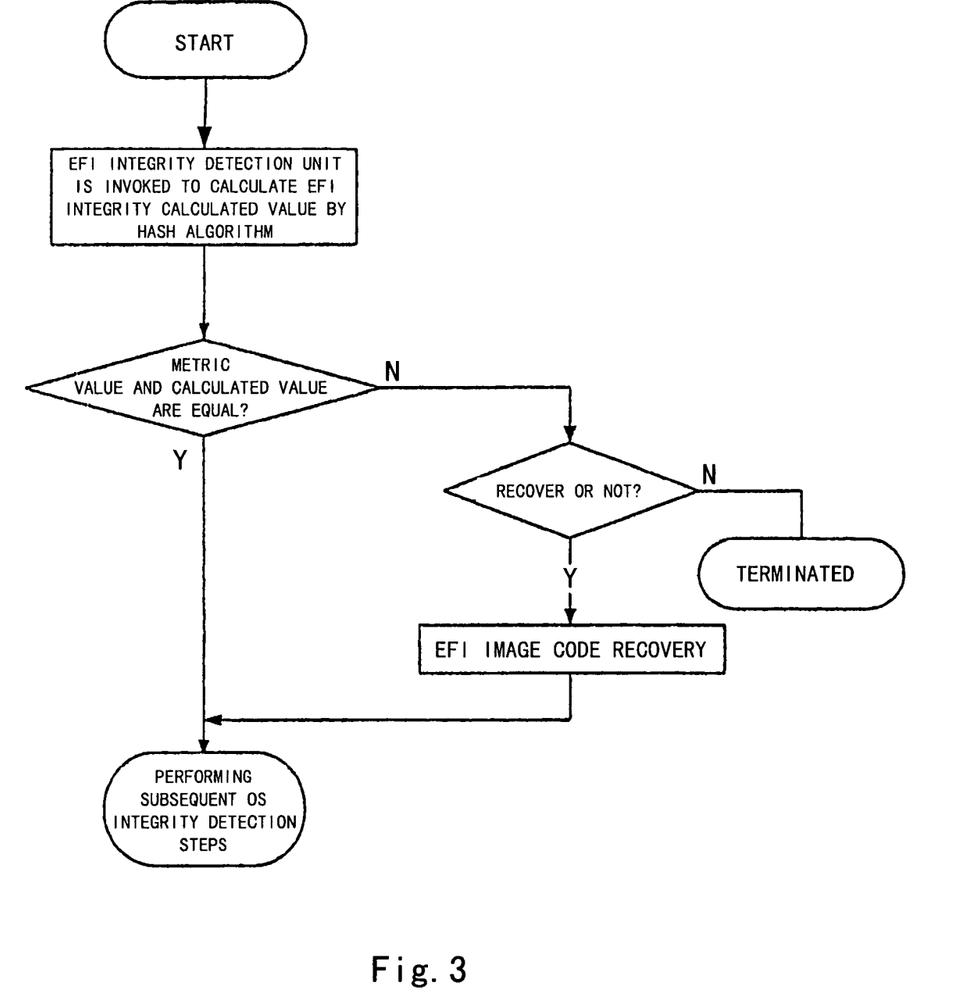
FIG. 3 is a flowchart for performing the EFI image file integrity detection according to the present invention.

If the integrity detection boot mode is booted, the EFI integrity detection unit 5 is run to perform the integrity detection on the EFI image code, to generate an EFI integrity calculated value, and to determine the integrity of the EFI image code according the comparison between the metric value and the calculated value.

The computer system of the present invention further comprises an EFI image code recovery unit 8. The EFI code in the above recovery unit is invoked to recover the EFI image code when it is determined that the EFI image code is not integral after the EFI integrity detection unit 5 performs the integrity detection on the EFI image code, generates the EFI integrity calculated value and compares the metric value and the calculated value.

The EFI computer system of the present invention further comprises an operating system integrity detection.

Figure 4:
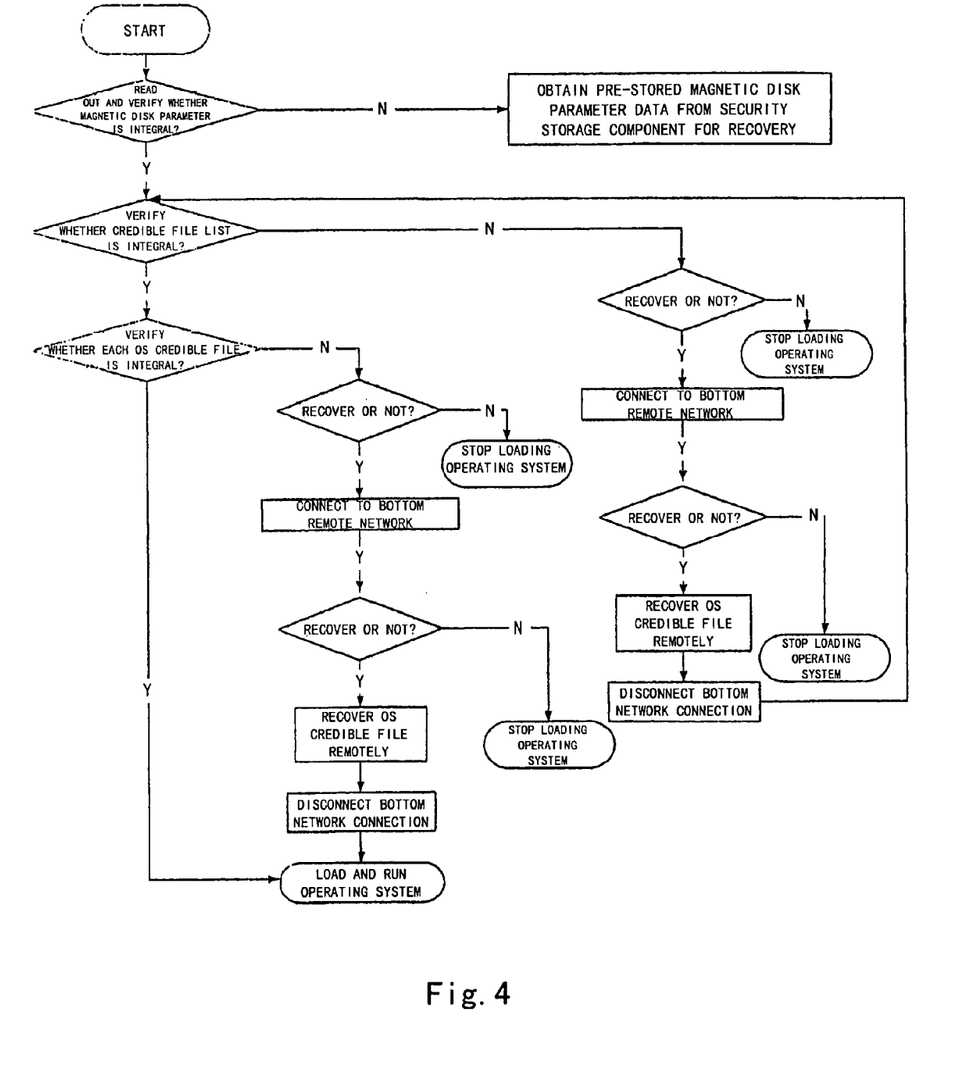
FIG. 4 is a flowchart for performing the operating system integrity detection according to the present invention.

In the integrity detection boot mode, when the system enters the DXE (Driver execution environment) stage and BDS (Boot Device Selection) stage after the EFI integrity detection unit 5 finishes the EFI integrity detection, the operating system integrity detection unit 6 (module) detects the integrity of the operating system, and then the operating system is booted.

The operating system integrity detection unit 6 is used to perform the operating system integrity detection before initializing the operating system. Said operation integrity detection unit 6 comprises a magnetic disk parameter data detection unit, for reading out the magnetic disk parameter data (such as a Master Boot Record (MBR) of the magnetic disk, active partition, partition table and the like), detecting whether the magnetic disk parameter data is integral or not. For example, it calculates the calculated value of the MBR, active partition and the partition table by a hash algorithm, compares it with the magnetic disk parameter metric value to detect whether the magnetic disk parameter data is integral or not.

Said magnetic disk parameter metric value 10 is pre-stored in the computer system, for being compared with the calculated value generated after the detection on the magnetic disk parameter, to determine whether the magnetic disk parameter is integral or not.

The computer system of the present embodiment further comprises a credible file list 11 of the operating system, for looking up and comparing the operating system credible file names to detect whether all the credible files are present or not.

The operating system credible files are a series of unchangeable files to keep the integrity of the operating system. When it is found that one or more file is tampered or is not integral, it may invoke the pre-saved correct file (the operating system credible recovery file) in the pre-stored location to forcibly recover the credible file.

The operating system integrity detection unit 6 further comprises a credible file detection unit for invoking the operating system integrity detection method, performing the integrity detection on each credible file, comparing and determining whether each credible file code is tampered or not, generating an credible file calculated value for each file to finish the comparison with the metric value, to perform integrity detection on the operating system files.

The operating system integrity detection method may be various methods for calculating the integrity of the operating system file code, which is a hash algorithm in the present embodiment. If it is determined that n kernel files of the operating system are the operating system credible files, when one of the n files (operating system credible files) is changed, which means that the operating system is not integral, the hash algorithm calculates a hash value for each file which records one hash value, which are compared one by one. If any hash value of the n files is changed, it means that the operating system integrity is destroyed.

The operating system integrity detection method may be replaced, which method may be complex or simple and therefore the actual implementation thereof is not limited.

Said computer system further comprises a credible file metric value, for being compared with a calculated value generated in turn for each file. After the operating system integrity detection unit performs the integrity detection on every credible file, it compares and determines whether any credible file is tampered or not, to determine the integrity of the individual credible files, to thereby determine the integrity of all the credible files of the operating system.

As shown in FIG. 6, the system performs operating system integrity detection, i.e. EFI integrity detection before initializing the operating system. Thereafter, the system enters the DXE stage to perform boot services, runtime service and enter a DXE dispatcher, during which the devices, bus, or serial drivers will be loaded, including the operating system integrity detection driver. When it enters the BDS stage, if the boot mode is the operating system integrity detection mode, the operating system integrity detection unit 6 is invoked to perform the operating system integrity detection.

The operating system integrity detection unit 6 first invokes the magnetic disk parameter data detection unit to read out the magnetic disk parameter MBR, the active partition, and partition table information, to calculate the calculated value of the MBR, the active partition, and the partition table information by a hash algorithm, to compare the calculated value with the magnetic disk metric value so as to detect whether the magnetic disk parameter is integral or not;
then it performs detection on the operating system credible file list 11 to check whether the credible files are all present or not;
at last, the credible file detection unit invokes the operating system integrity detection method to perform integrity detection on each credible file, to compare and judge whether each credible file is tampered, to generate a credible file calculated value for each file, and to perform integrity detection on the operating system files; determines the integrity of an individual credible file according to the comparison between the credible file metric value 12 and the calculated value, thereby determining the integrity of all the credible files of the operating system.

The codes in the operating system integrity detection unit are stored in the EFI code unit in a drive form, and the EFI BIOS invokes the operating system integrity detection unit in the driver form during the initializing process.

In the integrity detection boot mode of the present invention, during the DXE and the BDS stage, the included running code unit during the DXE stage comprises: a simple network driver and a simple TCP Socket driver, which are invoked to support the functions of operating system integrity detection during the BDS stage.

The computer system of the present invention further comprises:
an magnetic disk parameter data recovery unit 7; the magnetic disk parameter comprising MBR, active partition, partition table and the like; when the magnetic disk parameter data detection unit detects that the magnetic disk parameter is not integral, the magnetic disk parameter data in the magnetic disk parameter data recovery unit 7 is invoked to forcibly recover the magnetic disk data;
an operating system credible file recovery unit 9; the operating system credible files in the unit comprising the kernel files of the operating system, the key credible data files and the like. The operating system credible files can be customized according to the requirements for running the system as well as the user's requirements; after the operating system integrity detection unit performs integrity detection on the operating system files, the metric value and the calculated value are compared; when it is determined that the operating system files are not integral, the operating system credible files in the operating system credible file recovery unit 9 will be invoked to recover the operating system files.

Said credible file metric value 12, said magnetic disk parameter metric value 10, said credible file list 11, said EFI image recovery unit 8, said magnetic disk data recovery unit 7 and the operating system credible file recovery unit 9 may be stored in an EFI security storage component.

The EFI security storage component is a local security storage component or an external security storage component, which may be any security storage component connected via the system bus, USB, wireless network and wired network and comprises a hard disk having a security protection function (such as a hard disk having a Host Protected Area (HPA)), or a flash memory having an access control function, or a large capacity USB security memory having an access control function connected via an USB interface.

Preferably, said external security storage component is a remote security component, said operating system credible recovery file is stored in the remote security storage component; the credible file metric value 12, the magnetic disk parameter metric value 10, the credible file list 11, the EFI image code recovery unit 8 and the magnetic disk data recovery unit 7 are stored in the local security storage component. When it is determined that the operating system files are not integral, the simple network driver and the simple TCP Socket driver are invoked to connect to the remote security storage component to download the operating system credible files to local so as to recover the operating system files.

Since the EFI directly supports the file read/write functions, those files such as the EFI image files and the operating system credible files may be stored in the security storage component in a general file format, and may be accessed by using the EFI file access interface, which has a reduced complexity and a better extensibility than adding a series of file system access interfaces on the conventional BIOS.

Figure 5:
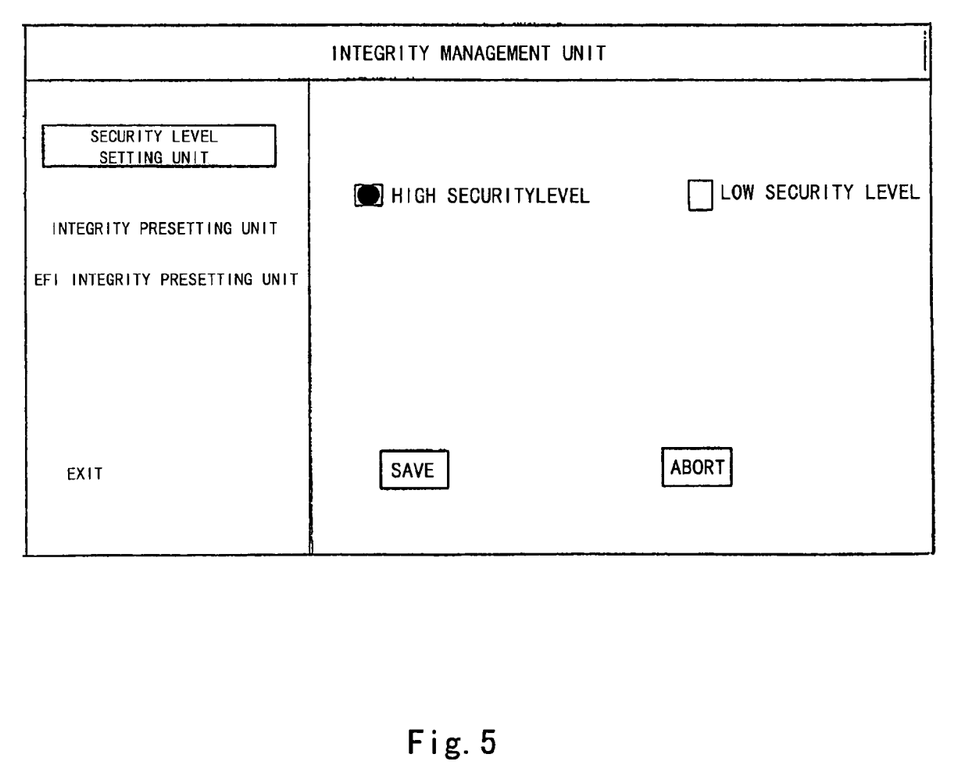
FIG. 5 is a schematic view of the integrity management interface according to the present invention.

The computer system of the present invention further comprises an integrity management unit, for setting whether the integrity detection boot mode is needed to be performed or not when booting the EFI, and allowing the users to customize the operating system credible files related to the operating system according to the requirement of the system running, and regenerating the magnetic disk parameter metric value. The user may perform a flexible integrity detection setting and management function in this management unit.

Said integrity management unit comprises:
a security level setting unit; when the user sets the current BIOS security level as "high security level", the integrity detection boot mode must be performed during the EFI BIOS boot procedure; only if the whole procedures of the EFI integrity detection and operating system integrity detection are completed, the operating system is allowed to be loaded; if "low security level" is set, which means the security level is low, then the user may not perform the integrity detection;
an operating system integrity file presetting unit; the user may customize his related credible files according to the requirements for running the system as well as the user's requirements; from this unit, the user may regenerate the magnetic disk parameter metric value 10, the credible file list 11, the credible file metric value 12 and other related credible files; when the integrity detection is performed on the system again, the operating system integrity detection will be performed based on the newly generated comparison bases;
an EFI integrity presetting unit; when the user selects the EFI integrity presetting management, the EFI integrity presetting unit is executed to generate a new EFI integrity metric value.

Preferably, the system is set in a way that only the administrator can enter the integrity management unit to perform the security level setting and the file presetting functions.

The present invention prestores the magnetic disk parameter metric value 10, the credible file list 11, the credible file metric value 12, the magnetic disk parameter data recovery unit 7, the EFI image code recovery unit 8, the operating system credible file recovery unit 9 into the security storage component to extend and achieve the EFI system framework capable of performing integrity detection, during the process of the EFI BIOS boot, which first performs an EFI integrity detection and then performs the operating system integrity detection in the computer bottom firmware running stage to determine the operating system to be booted, thereafter allows to boot and load the operating system. The present invention sufficiently ensure the reliable detection on the operating system before being initialized, which does not depend on the operating system but only depends on the detection chain of the EFI BIOS, ensuring the security and creditability of the operating system and thereby strictly ensuring the creditability of the running environment of the operating system to satisfy the application requirement. The implementation costs are low and the application interfaces have better usability.

The method for performing computer system integrity detection according to the present invention will be described in detail in conjunction with said computer system.

As shown in FIGS. 2-6, after the PEI stage and the basic initializations of the CPU, chipset and main board, the computer system of the present invention performs the EFI integrity detection, the operating system integrity detection, and may select whether or not to perform the file recovery when finding that the EFI image code or the operating system files are not integral during the integrity detection procedure, and may perform the operating system integrity detection management configuration.

The EFI integrity detection comprises steps of:
STEP A: the system is powered up to run the PEI stage; after the basic initializations of CPU (CPU INIT), chipset (Chipset INIT) and the main board (Board INIT) are finished, it is determined whether to initiate the integrity detection boot mode or not; if yes, STEP B is performed; otherwise the computer system is boot in the conventional boot mode;
STEP B: the EFI integrity detection unit 5 is invoked to calculate the EFI integrity calculated value by a hash algorithm when the EFI BIOS is booted in the integrity detection boot mode;
STEP C: the current EFI integrity metric value and the calculated value are compared with each other and it is judged whether they are equal or not; if they are equal, which means that the EFI image code is integral and the subsequent process of the EFI BIOS boot is performed, and if they are not equal, which means that the EFI image code is not integral;
STEP D: when the EFI image code is not integral, the user selects whether to invoke the EFI image file recovery code in the EFI image file recovery unit 9 or not; if yes, the EFI image code recovery is performed to finish the EFI integrity detection and the EFI subsequent process is performed; otherwise, it is terminated.

When the EFI integrity detection is finished, said computer system performs the operating system integrity detection which comprises steps of:

STEP E: after the EFI integrity detection is finished, the flow of the DXE stage is performed and the DXE dispatches an operating system integrity detection unit 6 to be loaded into the internal memory;
STEP F: it enters the BDS stage, and if the running mode is the integrity detection setting, said operating system integrity detection unit 6 in STEP E is invoked;
STEP G: the credible file detection unit in the operating system integrity detection unit 6 invokes the operating system integrity detection method to perform an integrity detection on each credible file, to compare and judge whether each credible file is tampered, to generate a credible file calculated value for each file in turn, and to detect the integrity of the operating system files.

Said STEP G may further comprise steps of:
STEP G1: The operating system integrity detection unit 6 first invokes the magnetic disk parameter data detection unit to reads out the magnetic disk parameter MBR, the active partition, and partition table information, to calculate the calculated value of the MBR, the active partition, and the partition table information by a hash algorithm, to compare the calculated value with the magnetic disk metric value 10 to detect whether the magnetic disk parameter is integral or not;
STEP G2: after the detection on the magnetic disk parameter data is finished, it performs the detection on the operating system credible file list 11, looks up and compares the names of the operating system credible files, detects whether or not all the credible files are present to ensure the integrity of the operating system credible files, then it invokes the credible file detection unit to perform the integrity detection on the individual files.

Said STEP G1 further comprises a step of:
STEP G11: when the magnetic disk parameter data detection unit detects that the magnetic disk parameter is not integral, the magnetic disk parameter data in the magnetic disk parameter data recovery unit 7 is invoked to forcibly recover the magnetic data.

Said STEP G2 further comprises a step of:
STEP G21: when the operating system credible file list 11 has been detected that the operating system credible file is not present, it informs the user that the operating system credible files can be recovered; if the user selects "Not Recover", it stops loading the operating system; and if the user selects "Recover", it invokes the simple network driver and the simple TCP Socket driver to connect to the remote network;
STEP G22: it detects whether the files of the local operating system coincide with the corresponding operating system credible files of the remote server or not; if yes, it disconnects the bottom level network connection and returns to perform the operating system credible file list 11 detection; otherwise, it goes to the next step;
STEP G23: it informs the user whether to recover or not; if the user selects "Not Recover", it stops loading the operating system; and if the user selects "Recover", the corresponding operating system files in the remote server are copied and sent to local to cover the corresponding files, then it disconnects the bottom level network connection and returns to perform the operating system credible file list 11 detection.
STEP H: the integrity of each individual credible file is determined according to the comparison between the credible file metric value and the calculated value, and then determining the integrity of all the credible files of the operating system;
STEP I: when the operating system files are not integral, it informs the user that the operating system credible file recovery may be performed; if the user selects "Not Recover", it stops loading the operating system, and if the user selects "Recover", it invokes the simple network driver and the simple TCP socket driver to connect to the remote network;

STEP J: it detects whether the files of the local operating system coincides with the corresponding operating system credible files in the remote server or not; if yes, it disconnects the bottom level network connection, loads and runs the operating system; otherwise, it goes to the next step;

STEP K: it informs the user whether to recover or not; if the user selects "Not Recover", it stops loading the operating system; and if the user selects "Recover", the corresponding operating system credible files in the remote server are copied and sent to local to cover the corresponding files, then it disconnects the bottom level network connection, loads and runs the operating system.

After the user has performed the operating system integrity detection, the system security configuration setting can be performed, which comprises steps of:

STEP L: after the user passes through the operating system integrity detection, he selects whether or not to enter the operating system integrity management unit by pressing a specific function key, STEP M: if the user does not select to enter the operating system integrity management unit, it directly initiates the operating system; and when the user selects to enter the operating system integrity management unit, it displays the operating system management interface, and the user performs management configurations on the operating system integrity;

STEP M1: when the user selects to perform the security level management, it runs the security level setting unit to set the current computer system security level by the user to achieve a flexible operating system integrity management function therein; if the high security level is set, the whole procedures of the integrity detection must be performed during the EFI BIOS boot procedure, and then the operating system can be loaded and run; if the low security level is set, the operating system integrity detection may not be performed;

STEP M2: when the user selects the operating system integrity file presetting management, the operating system integrity file presetting unit is run and the user is allowed to customize the related operating system credible files according to the requirements for running the system as well as the user's requirements;

STEP M21: the operating system integrity presetting unit is run and the user is informed to select to either add or reduce the operating system credible files;

STEP M22: it regenerates the magnetic disk parameter metric value, the credible file list, the credible file metric value and the related operating system credible files according to the operating system credible files selected by the user;

STEP M23: it stores the regenerated magnetic disk parameter metric value, credible file list, credible file metric value and the related operating system credible files into the security storage memory;

STEP M24: it returns to the operating system integrity management unit.

STEP M3: when the user selects the EFI code integrity presetting management, the EFI integrity presetting unit is run to generate the new EFI integrity metric value.

The present invention achieves a method and a system for performing the operating system integrity detection during the computer's bottom firmware running (Pre-boot) stage of the EFI BIOS. It effectively solves the authentication of the operating system integrity in the EFI BIOS level before booting the operating system; it effectively ensures the consistency and strictness of the security and credibility chain to satisfy the security requirements in using the computer. The operating system can be directly booted after the integrity detection is finished, avoiding the design of the operating system booting flag bit and obtaining good experience of the users. It effectively resolves the defects present on various methods mentioned above. The system and the method of the present invention may support many functions. They have the advantages of being simple and better usability. The present invention supports to store the operating system credible files in the remote security storage component so as to achieve the remote operating system integrity detection and recovery, such that the applicable ranges of the present invention are enlarged to present a great advantage over the prior arts.

Further, the present invention provides a friendly graphic user security management and configuration interface to present better usability and flexibility. With the EFI graphic basic interface in conjunction with the extended method, the user may use a uniform graphic interface to perform the operating system integrity management and configuration functions, so that the present technical solution can be more flexible and easier to use.

The present embodiment is a detailed description provided for further understanding of the present invention and is not to limit the scope of the present invention. Therefore, it is appreciated by those skilled in the art that the modifications can be made without departing from the scope of the present invention, which is solely defined in the following claims.

What is claimed is:

1. A computer system including hardware and software, the hardware including a main board, a central processing unit (CPU), an internal memory, a hard disk and peripheral equipment, the computer system being capable of performing integrity detection, comprising:

a running mode circuit having software configured to determine, after the basic initialization of the central processing unit (CPU), chipsets, and the main board is finished in a Pre-Extensible Firmware Interface (PEI) stage, whether or not to initialize an integrity detection initiating mode by judging an integrity detection initiating control parameter;

an Extensible Firmware Interface (EFI) storage unit configured to include an EFI integrity detection application for performing the integrity detection on the EFI image codes in the integrity detection initiating mode to generate an EFI integrity calculated value and comparing the calculated value with an integrity metric value to determine the integrity of the EFI image codes;

an operating system integrity detection application, for forcibly performing an operating system integrity detection before initiating an operating system;

wherein said operating system integrity detection application comprises a credible file detection application, for invoking the operating system integrity detection method to perform the integrity detection on all credible files, comparing and determining whether each of the credible files are tampered, generating a credible files calculated value for each of the files in turn, and performing the integrity detection on the files of the operating system;

said computer system further comprises a credible file metric value which is compared with the calculated value to determine the integrity of an individual file to thereby determine the integrity of all the files of the operating system, after the operating system integrity detection unit performs the integrity detection on all credible files, compares and determines whether each of the credible files are tampered, and generates the credible files calculated value for each of the files in turn;

wherein said operating system integrity detection application further comprises a magnetic disk parameter data detection application, for reading out a magnetic disk parameter data, detecting whether the magnetic disk parameter data is integral, and then invoking the credible file detection application to perform the integrity detection on the individual credible file; and said computer system further comprises a magnetic disk parameter metric value which is compared with the calculated value to determine the integrity of the operating system after the operating system integrity detection application performs the magnetic disk parameter integrity detection on the magnetic disk on which the files of the operating system are stored and generates a magnetic disk parameter integrity calculated value.

2. The computer system according to claim 1, wherein the software of the running mode circuit is stored in a hardware unit.

3. The computer system according to claim 1, wherein a running code application (Firmware Volume (FV) RECOVERY application) in said EFI storage unit is a read-only code application.

4. The computer system according to claim 1, further comprising:
an EFI image code recovery application, for invoking an EFI image recovery code in said EFI image code recovery application to recover the EFI image code when the EFI integrity detection application performs the integrity detection on the EFI image code and determines that the EFI image code is not integral.

5. The computer system according to claim 1, further comprising a magnetic disk parameter data recovery application, for invoking the magnetic disk parameter data in said magnetic disk parameter data recovery application to forcibly recover the magnetic disk data when the magnetic disk parameter data detection application detects that the magnetic disk parameter is not integral.

6. The computer system according to claim 1, further comprising a credible file list, for looking up and comparing, after the magnetic parameter data detection is finished, system credible file names, detecting whether all the credible files are present to ensure the integrity of the operating system credible files, and then invoking the credible file detection application to perform the integrity detection on the individual credible file.

7. The computer system according to claim 6, further comprising an operating system credible file recovery application, for invoking the pre-saved operating system credible recovery files to recover the credible files forcibly, when said operating system credible file recovery application determines that the operating system credible files are not integral or are tampered after the operating system integrity detection application compares the operating system credible files through the credible file list or the credible file metric value and performing the integrity detection, thereby recovering the entire operating system environment.

8. The computer system according to claim 7, wherein the credible file metric value, the magnetic disk parameter metric value, the credible file list, the EFI image code recovery unit, the magnetic disk parameter data recovery application and the operating system credible file recovery application are stored into an EFI security storage component.

9. The computer system according to claim 8, wherein said EFI security storage component is a local security storage component or an external security storage component.

10. The computer system according to claim 9, wherein when said external security storage component is a remote security component, said operating system credible file recovery unit is stored in the remote security storage component;

said computer system further comprises a simple network driver and a simple Transmission Control Protocol (TCP) Socket driver, for being invoked to connect to the remote security storage component through a network, downloading the operating system credible recovery files stored in the remote security storage component into local, and recovering the operating system files, when the operating system files are determined to be not integral.

11. The computer system according to claim 1, further comprising an integrity management application, for setting whether an integrity detection boot mode is needed to be performed when booting the EFI, and allowing a user to customize the operating system credible files related to the operating system according to the requirement of the system running, and to regenerate the magnetic disk parameter metric value, a credible file list and the credible file metric value.

12. The computer system according to claim 11, wherein said integrity management application comprises:
a security level setting application, for setting the boot mode of said computer system;
an integrity presetting application, for customizing the operating system credible files and regenerating a magnetic disk parameter metric value, credible file list, the credible file metric value and the operating system credible files, and performing the integrity detection on the operating system according to the new comparison reference when the system performs the integrity detection again; and
an EFI integrity presetting application, for generating a new EFI integrity metric value when the user selects the EFI integrity presetting management.

13. A method for performing computer system integrity detection, which is characterized in comprising an Extensible Firmware Interface (EFI) integrity detection, comprising steps of:
STEP A: the system is powered on to run a Pre-Extensible Firmware Interface (PEI) stage, after basic initializations of a Central Processing Unit (CPU), chipset and the main board are finished, it is determined whether to initiate an integrity detection boot mode or not; if yes, STEP B is performed; otherwise the computer system is booted in a conventional boot mode;
STEP B: an EFI integrity detection unit is invoked to calculate an EFI integrity calculated value when an EFI Basic Input and Output System (BIOS) is booted in the integrity detection boot mode;
STEP C: a current EFI integrity metric value and the calculated value are compared with each other and it is judged whether they are equal or not; if they are equal, which means that an EFI image code is integral, the subsequent process of the EFI BIOS boot is performed;
wherein the method further comprises an operating system integrity detection comprising steps of:
STEP E: after the EFI integrity detection is finished, a flow of a data examination engine (DXE) stage is performed and a DXE dispatches an operating system integrity detection unit to be loaded into an internal memory;
STEP F: a Boot Device Selection (BDS) stage is entered, and if a running mode is an integrity detection setting, said operating system integrity detection unit in STEP E is invoked;
STEP G: a credible file detection unit in the operating system integrity detection unit invokes an operating system integrity detection method to perform an integrity detection on each credible file, to compare and judge whether each credible file is tampered, to generate a credible file calculated value for each file in turn, and to detect the integrity of the operating system files;

STEP H: the integrity of each individual credible file is determined according to the comparison between the credible file metric value and the calculated value, and thereby determining the integrity of all the credible files of the operating system;

wherein said STEP G further comprises a step of:

STEP G1: the operating system integrity detection unit first invokes a magnetic disk parameter data detection unit to read out a magnetic disk parameter, an active partition, and partition table information, to calculate a calculated value of the magnetic disk parameter, the active partition, and the partition table information by a hash algorithm, to compare the calculated value with a magnetic disk metric value to detect whether the magnetic disk parameter is integral, then invokes the credible file detection unit in the operating system integrity detection unit to perform the integrity detection on the individual credible file.

14. The method for performing computer system integrity detection according to claim 13, wherein said EFI integrity detection further comprises a step of:

STEP D: when the EFI image code is not integral, the user selects whether to invoke an EFI image file recovery code in an EFI image file recovery unit or not; if yes, the EFI image code recovery is performed to finish the EFI integrity detection and an EFI subsequent process is performed; otherwise, it is terminated.

15. The method for performing computer system integrity detection according to claim 13, wherein said operating system integrity detection further comprises steps of:

STEP I: when the operating system credible files are tampered, a user is informed that an operating system credible file recovery may be performed; if the user selects "Not Recover", it stops loading the operating system, and if the user selects "Recover", it goes to the next step;

STEP J: it detects whether the files of the operating system coincide with the corresponding operating system credible files or not; if yes, it loads and runs the operating system; otherwise, it goes to the next step;

STEP K: the user is informed whether to perform the recovery; if the user selects "Not Recover", it stops loading the operating system; and if the user selects "Recover", the corresponding operating system credible files are copied to cover the corresponding files, the operating system is loaded and run.

16. The method for performing computer system integrity detection according to claim 13, wherein said STEP G1 comprises a step of:

STEP G11: when the magnetic disk parameter data detection unit detects that the magnetic disk parameter is not integral, the magnetic disk parameter data in a magnetic disk parameter data recovery unit is invoked to forcibly recover a magnetic disk data.

17. The method for performing computer system integrity detection according to claim 16, wherein said STEP G further comprises a step of:

STEP G2: after the detection on the magnetic disk parameter data is finished, it performs an operating system credible file list detection, looks up and compares names of the operating system credible files, detects whether all the credible files are present to ensure the integrity of the operating system credible files, then it invokes the credible file detection unit to perform the integrity detection on the individual files.

18. The method for performing computer system integrity detection according to claim 17, wherein said STEP G2 further comprises a step of:

STEP G21: when the operating system credible file list has been detected that the operating system credible file is not present, it invokes an operation credible file recovery unit to forcibly recover said operating system credible file.

19. The method for performing computer system integrity detection according to claim 13, wherein said operating system integrity detection further comprises steps of:

STEP I: when the operating system files are not integral, it informs a user that the operating system credible file recovery can be performed; if the user selects "Not Recover", it stops loading the operating system; and if the user selects "Recover", it invokes a simple network driver and a simple Transmission Control Protocol (TCP) Socket driver to connect to a remote network;

STEP J: it detects whether the files of the operating system coincide with the corresponding operating system credible files or not; if yes, it disconnects a bottom level network connection, loads and runs the operating system; otherwise, it goes to the next step;

STEP K: it informs the user whether to recover or not; if the user selects "Not Recover", it stops loading the operating system; and if the user selects "Recover", the corresponding operating system credible files in the remote server are copied and sent to local to cover the corresponding files, then it disconnects a bottom level network connection, loads and runs the operating system.

20. The method for performing computer system integrity detection according to claim 19, wherein said STEP G1 comprises a step of:

STEP G11: when the magnetic disk parameter data detection unit detects that the magnetic disk parameter is not integral, the magnetic disk parameter data in a magnetic disk parameter data recovery unit is invoked to forcibly recover an magnetic disk data.

21. The method for performing computer system integrity detection according to claim 20, wherein said STEP G further comprises a step of:

STEP G2: after the detection on the magnetic disk parameter data is finished, it performs an operating system credible file list detection, looks up and compares names of the operating system credible files, detects whether all the credible files are present to ensure the integrity of the operating system credible files, then it invokes the credible file detection unit to perform the integrity detection on the individual file.

22. The method for performing computer system integrity detection according to claim 21, wherein said STEP G2 further comprises steps of:

STEP G21: when the operating system credible file list has been detected that the operating system credible file is not present, it informs the user that the operating system credible files can be recovered; if the user selects "Not Recover", it stops loading the operating system; and if the user selects "Recover", it invokes a simple network driver and a simple TCP Socket driver to connect to a remote network;

STEP G22: it detects whether the files of the local operating system coincide with the corresponding operating system credible files or not; if yes, it disconnects a bottom level network connection and returns to perform the operating system credible file list detection; otherwise, it goes to the next step;

STEP G23: it informs the user whether to recover or not; if the user selects "Not Recover", it stops loading the operating system; and if the user selects "Recover", the corresponding operating system files in the remote server are copied and sent to local to cover the corresponding files, then it disconnects a bottom level network connection and returns to perform the operating system credible file list detection.

23. The method for performing computer system integrity detection according to claim 13, further comprising an integrity management configuration, which comprises steps of:

STEP L: after the user passes through the operating system integrity detection, it is selected whether to enter an operating system integrity management unit;

STEP M: if the user does not select to enter the operating system integrity management unit, it directly initiates the operating system; and when the user selects to enter the operating system integrity management unit, it displays an operating system management interface, and the user performs management configurations on the operating system integrity.

24. The method for performing computer system integrity detection according to claim 23, wherein said STEP M comprises steps of:

STEP M1: when the user selects to perform a security level management, it runs a security level setting unit to set a current computer system security level;

STEP M2: when the user selects an operating system integrity file presetting management, an operating system integrity file presetting unit is run, and the user customizes the operating system credible files.

STEP M3: when the user selects an EFI code integrity presetting management, an EFI integrity presetting unit is run to generate a new EFI integrity metric value.

25. The method for performing computer system integrity detection according to claim 24, wherein said STEP M2 comprises steps of:

STEP M21: the operating system integrity presetting unit is run and the user is informed to select to either add or reduce the operating system credible files;

STEP M22: it regenerates a magnetic disk parameter metric value, a credible file list, a credible file metric value and the related operating system credible files, according to the operating system credible files selected by the user;

STEP M23: it stores the regenerated magnetic disk parameter metric value, credible file list, credible file metric value and the related operating system credible files into a security storage memory;

STEP M24: it returns to the operating system integrity management unit.

* * * * *